United States Patent
Nakano et al.

(10) Patent No.: US 9,479,676 B2
(45) Date of Patent: Oct. 25, 2016

(54) PRINTER AND PROGRAM

(71) Applicant: SEIKO EPSON CORPORATION, Tokyo (JP)

(72) Inventors: Tomoyuki Nakano, Shiojiri (JP); Hiroshi Shirotori, Azumino (JP); Yoshiyuki Ozawa, Shiojiri (JP); Kanako Ide, Shiojiri (JP); Katsumi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/449,877

(22) Filed: Aug. 1, 2014

(65) Prior Publication Data

US 2015/0035889 A1 Feb. 5, 2015

(30) Foreign Application Priority Data

Aug. 2, 2013 (JP) .................................. 2013-161858

(51) Int. Cl.
  *B41J 29/38* (2006.01)
  *H04N 1/405* (2006.01)
  *B41J 2/21* (2006.01)

(52) U.S. Cl.
  CPC ........... *H04N 1/4057* (2013.01); *B41J 2/2128* (2013.01)

(58) Field of Classification Search
  CPC ......... B41J 11/42; B41J 29/38; B41J 29/393
  USPC .......................................................... 347/16
  See application file for complete search history.

(56) References Cited

U.S. PATENT DOCUMENTS

| 7,556,330 | B2 * | 7/2009 | Saito et al. | 347/14 |
|---|---|---|---|---|
| 8,136,938 | B2 * | 3/2012 | Karszes et al. | 347/105 |
| 2006/0232632 | A1 | 10/2006 | Kosugi | |
| 2007/0057985 | A1 | 3/2007 | Saito et al. | |
| 2009/0267985 | A1 | 10/2009 | Usui | |

FOREIGN PATENT DOCUMENTS

| JP | 07-281327 A | 10/1995 |
|---|---|---|
| JP | 2001-042462 A | 2/2001 |
| JP | 2005-001202 A | 1/2005 |
| JP | 2005-022404 A | 1/2005 |
| JP | 2006-272635 A | 10/2006 |
| JP | 2009-262447 A | 11/2009 |

\* cited by examiner

*Primary Examiner* — Jannelle M Lebron
*Assistant Examiner* — Jeremy Bishop
(74) *Attorney, Agent, or Firm* — Global IP Counselors, LLP

(57) ABSTRACT

A printer includes a liquid ejection section and a drive control section. The liquid ejection section is configured to eject a plurality of types of liquids and form dots having different sizes. The drive control section is configured to control a dot size of the liquids to be ejected by the liquid ejection section based on image data. When an image including a three-dimensional image in which a plurality of linear images are arrayed is printed on a medium, the liquid ejection section is configured to eject the liquids, at least in an end section area in an array direction of the linear images in a print area of the image, under a setting in which an ejection ratio of relatively small dots is set lower than in an inner area that is positioned more inward than the end section area.

8 Claims, 8 Drawing Sheets

PRINTER AND PROGRAM

CROSS-REFERENCE TO RELATED APPLICATIONS

This application claims priority to Japanese Patent Application No. 2013-161858 filed on Aug. 2, 2013. The entire disclosure of Japanese Patent Application No. 2013-161858 is hereby incorporated herein by reference.

BACKGROUND

1. Technical Field

The present invention relates to a printer having a liquid ejection section capable of ejecting a liquid such as an ink, and also relates to a program.

2. Related Art

For example, in a printer such as an ink-jet printer, etc., an ink is ejected from a nozzle of a liquid ejection head (one example of a liquid ejection section) to print an image, etc., on a medium such as a sheet. Also, in a printer of this kind, a printer to eject ink drops having a plurality of sizes from the nozzle of the liquid ejection head to obtain a high quality printed matter is known.

Japanese Unexamined Patent Application Publication No. 2005-22404 discloses a recording device capable of ejecting ink drops having a plurality of dot diameters from a nozzle of a recording head (an example of a liquid ejection section). For example, in cases where a frameless printing is performed, when recording is performed in the area near the end section of the recording medium in the recording area including the recording medium, the discharge frequency of dots formed by a relatively larger dot diameter among a plurality of dot diameters is changed to be higher. That is, the discharge frequency of dots formed by relatively smaller dot diameters is changed to be fewer. The dot diameters are controlled in such a way as to reduce generation of mists for the following reasons.

Since the distance from the nozzle forming face of the recording head to the surface of the ink absorber provided at a position in which the ink for the area outside the recording medium is ejected is larger than the distance to the surface of the recording medium, mists are more likely to be generated when ink drops are ejected in the area outside the recording medium. Furthermore, small ink drops generate more mists than large ink drops. Therefore, when recording is performed with small ink drops in the area outside the recording medium, mists are most likely to be generated.

For example, Japanese Unexamined Patent Application Publication No. 2005-1202 discloses a printer in which, in the normal print area inner than the edge of a sheet, high quality printing is performed by combining three types of dots, large, medium, and small dots, and on the other hand, in the mask area in the vicinity of the end section of the sheet, two types of dots, large and medium dots, are combined to perform printing preventing the generation of ink mists.

In the meantime, a technology for printing a three-dimensional image on a medium arranged so as to face a lens layer such as a lenticular lens, etc., to enable three-dimensional visualization of the image is disclosed (Japanese Unexamined Patent Application Publication No. 2001-42462 and Japanese Unexamined Patent Application Publication No. H7-281327, etc.).

Since a three-dimensional image requires high resolution, printing by ejecting ink drops of dot sizes including at least small dots is required. However, as explained above, mists are more likely to be formed when the ink drops are small. If small ink drops are used outside a sheet especially during frameless printing, the distance to reach the ink absorbing material becomes longer than the distance to the sheet surface, thereby making it more likely for mists to form around the end section of the medium. Therefore, when printing an image including a three-dimensional image on a medium, there is a requirement that generation of mists should be reduced while performing printing at a relatively high definition by ejecting ink drops of one type or more dot sizes including small dots.

This requirement arises not only in the case of using a lenticular lens but also in the case of using a lens layer of other type for three-dimensional visualization. Also, there is a similar requirement not only when a three-dimensional image is printed on a lens sheet, but also when a lens layer such as a lenticular lens, etc., is pasted after a three-dimensional image is printed on a print medium, or when a lens layer is formed by, for example, an ink-jet record method on a print medium to which a three-dimensional image is printed.

SUMMARY

The present invention was made to solve the aforementioned problems, and its object is to provide a printer and a method capable of reducing mists generated at the time of printing an image while suppressing deterioration on image quality of the image including a three-dimensional image when observed through a lens layer.

Hereinafter, means for solving the aforementioned problems, functions and effects thereof will be described.

The printer solving the aforementioned problems includes a liquid ejection section configured to eject a plurality of types of liquids and form dots having different sizes, and a drive control section configured to control a dot size of the liquids ejected by the liquid ejection section based on image data. When an image including a three-dimensional image in which a plurality of linear images are arrayed is printed on a medium, at least in an end section area in the array direction of the linear images in a print area of the image, the liquid ejection section is configured to eject a liquid under a setting in which an ejection ratio is set lower for a dot relatively smaller than that in an inner area that is positioned more inward than the end section area.

"A setting in which an ejection ratio is lowered for a dot relatively smaller" refers to a setting in which, when the same image data is used for comparison, the ejection ratio for a relatively smaller dot is lowered.

Also, the phrase "an ejection ratio is set lower for a dot relatively smaller" denotes, in the case of two types of dot sizes, small and large, the ratio of large dots is high in the end section area compared to the inner area (all including large dots), in the case of three types of dot sizes, large, medium and small, the ejection ratio of medium dots and large dots are higher in the end section area compared to the inner section area (including the case in which only small dots or only small and medium dots are in the inner section and only large dots are in the end section area), and in the case of two types of dot sizes, small and medium, the ratio of medium dots is higher in the end section area than in the inner section area (including the case in which dots are all medium dots).

According to such a structure, when a liquid ejection section ejects a liquid to print an image including a three-dimensional image on a medium, in the end section area at least in the array direction (the lens intersection direction intersecting with the lens longitudinal direction when the medium has a lens layer such as a lenticular lens, etc.) of a linear image (division compression image) in the print area of an image, the liquid is ejected under a setting in which the ejection ratio for relatively small dots is lower than in the inner section area of the print area. Therefore, for example, when the print area is larger than the medium in the linear image array direction, or when the print area is the same size as the medium, or when the print area is slightly smaller than the medium, even if the medium is slightly misaligned from the print area in the linear image array direction, the ejection ratio of small dots ejected outside the end section of the medium is reduced, thereby reducing the mists that does not impact-land on the medium and drifts. Also, since the array direction of the linear images matches the array direction of the lens and is a direction in which the resolution decreases depending on the lens width when a three-dimensional image is observed through the lens, even though the rate of formation of relative large dots on the end section of the array direction of the medium is increased, the decrease in resolution when the three-dimensional image is observed through the lens is hard to notice. Therefore, the mists generated at the time of printing the image can be reduced while suppressing the decrease in image quality of an image including a three-dimensional image when observed through the lens layer.

In the aforementioned printer, it is preferable that the medium is a lens sheet including a lenticular lens.

According to this structure, in the end section area at the time of printing on a lens sheet, generation of mists are suppressed since the ejection ratio of small dots is reduced. Also, although larger dots are formed since the formation ratio of small dots decreases for the end section area and the dot formation ratio for larger sizes increases, since the lens array direction (that is, the linear image array direction) of the lens sheet is the direction in which the resolution is lower when the three-dimensional image is observed through the lens layer (in the direction of rough resolution), the reduction in resolution is harder to notice although larger dots are formed. Therefore, although the formation ratio of larger dots is higher in the end sections of the lens sheet, the reduction in resolution when the three-dimensional image is observed through the lenticular lens becomes less conspicuous.

In the aforementioned printer, the liquid ejection section is configured to eject the liquid in the end section area of the print area under the setting in which the ejection ratio of larger dots is increased than in the inner section area of the print area. "The setting in which the ejection ratio of relatively larger dots is lowered" refers to a setting in which, when the same image data is used for comparison, the ejection ratio for a relatively large dot is higher.

According to the structure, in the end section area of the print area, a liquid is ejected under a setting in which the ejection ratio for large dots is set higher than in the inner section area. Therefore, large dots are ejected in the end section of the medium and outside thereof, thereby making it possible to reduce the amount of mists generated. Although large dots are formed at the end section of the medium, since the array direction of the linear images (that is, the array direction of lenses) is a direction in which the resolution is low when the three-dimensional image is observed through the lens layer (direction in which the resolution is rough), the reduction in resolution when the three-dimensional image is observed through the lens layer becomes less inconspicuous.

In the printer, it is preferable that, at least in the array direction, the print area is larger than a medium area.

According to the structure, in the section protruding outward than the medium area in the print area, a liquid is ejected with the formation ratio of small dots lowered. Therefore, mists of the liquid ejected toward the area protruded outside than the medium can be reduced.

In the printer, in the end section area, it is preferable that the liquid ejection section is configured to eject the liquids having the largest dot size among ejectable dot sizes.

According to this structure, in the end section area of the image, a liquid is ejected with the largest dot size. Therefore, drifting mists can be more effectively reduced.

In the printer, it is preferable that the inner section area is set in the entire area in a longitudinal direction of the linear image of the print area.

According to this structure, the liquid ejection section prints an image in the entire area up to the end in the longitudinal direction of the linear image in the image in the inner section area, in comparison to the end section area, in a relatively high resolution under a setting in which the ejection ratio of small dots is high or under a setting in which the ejection ratio of large dots is low. When the lens layer is made of a lenticular lens, for example, in the longitudinal direction of the lens, images are printed at a high resolution. Therefore, when a three-dimensional image is observed through the lens layer, the inner section area of the image can be observed at a relatively high resolution in the entire longitudinal direction of the lens.

In the printer, it is preferable that, even in the end section area, for the range of the object in which a moving distance in the three-dimensional image exceeds a threshold, the liquid ejection section is configured to eject the liquid under a same dot size condition equal to a dot size condition of the inner section area. Here, the definition of the moving distance differs depending on whether the three-dimensional image is a change image or a stereoscopic image. The moving distance in a change image is a value for determining the amount of the movement of a partial image at a predetermined position in the three-dimensional image when a lens sheet is held, in which a three-dimensional image medium is arranged so as to face the lens layer so that the line connecting the eyes of the user and the longitudinal direction of the lens are orthogonal to each other, and the lens sheet is moved so as to be rotated around the predetermined axis of the lens as the center under a certain observation condition. Also, the moving distance of the stereoscopic image is defined as follows. A lens sheet is held, in which a three-dimensional image medium is arranged so as to face the lens layer so that the line connecting the eyes of the user and the longitudinal direction of the lens are orthogonal to each other, and in this state, the three-dimensional image is observed through the lens layer.

The moving distance is a value for determining the relative position of a partial image in the depth direction with respect to the central position observed so as to be positioned on the front side or the back side in the depth direction with respect to the central position (moving distance=0) of the image in the depth direction.

According to this structure, even in the end section area, for an object (stereoscopic object or change object) (partial image) in which the moving distance in the three-dimensional image exceeds the threshold, drawing is performed with a liquid ejected under the same dot size condition of the inner area. When the three-dimensional image is a change image, for printing the partial image having a relatively large amount of movement in which the moving distance exceeds the threshold, printing with a relatively high resolution under the same dot size condition as the inner section area is allowed. When the three-dimensional image is a stereoscopic image, for printing the partial image observed at a front side or back side position beyond the threshold for the central position in the depth direction of the image in which the moving distance exceeds the threshold, printing with a relatively high resolution under the same dot size condition as the inner section area is allowed. Therefore, the object in the three-dimensional image can be visualized three-dimensionally in a comparatively clear manner up to the end section area section.

According to another aspect of the invention, a print data generation method for causing a printer to print an image including a three-dimensional image on a medium arranged so as to face a lens layer having a plurality of lenses comprises judging whether or not a target area in a print area of the image belongs to an end section area or an inner section area in an array direction of a plurality of linear images constituting the three-dimensional image, performing a first halftone processing for generating dots under a high resolution dot size condition for the target area of the image when the target area is the inner section area, and performing a second halftone processing for generating dots under a dot formation condition in which a formation ratio of relatively small dots is less than the first halftone processing when the target area is the end section area.

According to this structure, print data for making the printer print can be provided.

BRIEF DESCRIPTION OF THE DRAWINGS

Referring now to the attached drawings which form a part of this original disclosure.

DETAILED DESCRIPTION OF EXEMPLARY EMBODIMENTS

An embodiment of a printer will be explained based on FIGS. 1 to 15.

Figure 1:
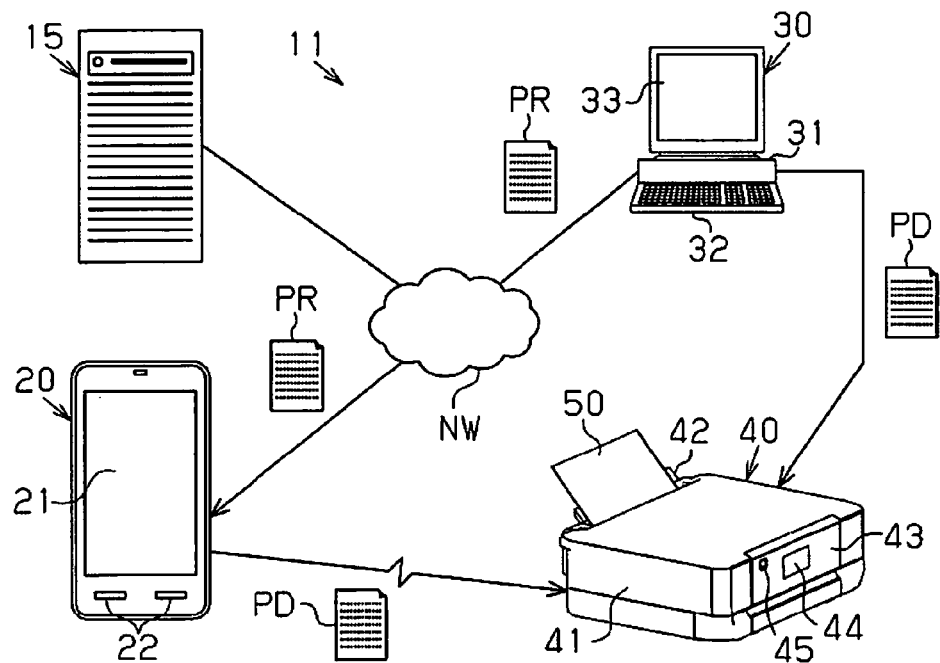
FIG. 1 is a schematic view showing an embodiment of a print system.

The print system 11 shown in FIG. 1 is a system capable of printing a three-dimensional image on a lens sheet. The print system 11 includes a server 15 providing contents for three-dimensional image printing, a mobile terminal 20 for the user to display print images and perform printing operation, a host device 30 and a printer 40.

Plural types of contents are stored in the server 15. A user downloads contents including a program PR and a desired three-dimensional image data GD from the server 15 at no charge or at a charge to the mobile terminal 20 or the host device 30 via the Internet NW.

The mobile terminal 20 is equipped with a display section 21 and an operating section 22, and various instructions can be given by a touch operation of the screen of the display section 21. Also, the host device 30 is equipped with a main body 31, an input section 32 and a monitor 33. The user can check the three-dimensional visualization image by previewing it on the display section 21 or the monitor 33 before printing. If the user is okay with the preview check, the user gives an instruction to execute the printing by operating the operating section 22 (or the screen touch operation) or the input section 32. The user sets the print condition in advance according to need. One of the print conditions is a "print mode." There are print modes such as a "high image quality mode" which prioritizes the print image quality than the print speed and a "low image quality mode" which prioritizes the print speed than the print image quality. When the user performs the operation to give an instruction to execute the printing using the mobile terminal 20, the print data for the three-dimensional image is transmitted to the printer 40 from the mobile terminal 20 along with the print condition.

As the mobile terminal 20, a smartphone, a mobile phone, a tablet PC, a personal digital assistant (PDA (Personal Digital Assistants)), etc., can be used.

The printer 40 is equipped with a main body 41 having an approximately rectangular shape, a manual feeding section 42 provided on the back face side of the main body 41 and capable of setting a medium, and an operation panel 43 provided on the front face (right side front face of FIG. 1) of the main body 41. The operation panel 43 is equipped with a display section 44 and an operating section 45. The lens sheet 50 is set to the feeding section 42 in an inclined posture. In addition, in this embodiment, the touch panel function of the display section 44 also constitutes a section of the operating section. When the printer 40 receives the print data PD, it prints an image including at least a three-dimensional visualization image based on the print data PD while feeding the lens sheet 50.

Figure 2:
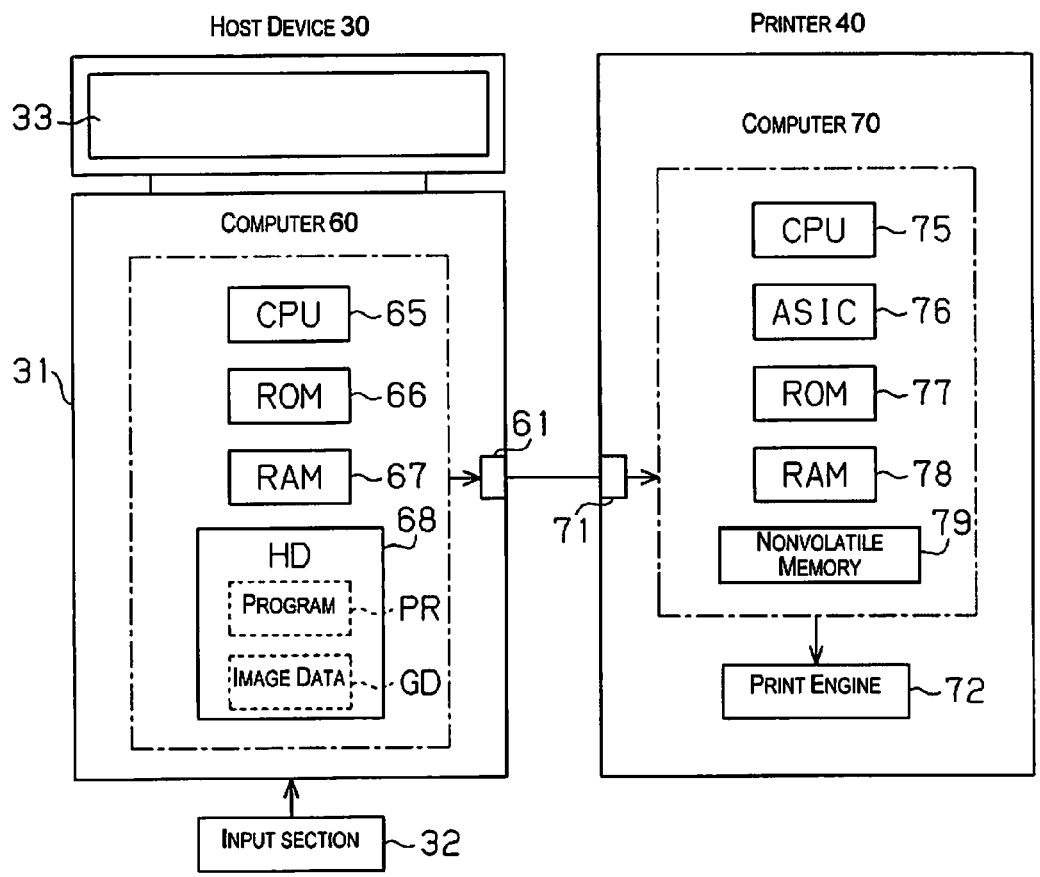
FIG. 2 is a block diagram showing electrical constitutions of a host device and a printer.

Next, the electrical structure of the host device 30 and the printer 40 will be explained with reference to FIG. 2. As shown in FIG. 2, the main body 31 of the host device 30 is equipped with a computer 60 and a communication section 61. The computer 60 is equipped with a CPU 65 (central processing unit), a ROM 66, a RAM 67, and a hard disk drive as an example of a recording section (hereinafter simply referred to as "HD 68"). A certain program is stored in the ROM 66. Also, in the HD 68, a program PR constituting contents downloaded from the server 15 and the image data GD for the three-dimensional image printing are stored. The program PR includes, for example, a printer driver program and a program for three-dimensional image previews. The image data GD is used for a preview at the time of three-dimensional image printing. The CPU 65 performs the preview processing and the print image data generation processing by executing the program PR. The CPU 65 makes the monitor 33 display a preview of the three-dimensional visualization image based on the image data generated by the preview processing via a display circuit which is not illustrated. In addition, print data of the three-dimensional image can be prepared in advance as the contents, and in this case, the print data of the three-dimensional image is stored in the HD 68.

Also, as shown in FIG. 2, the printer 40 is equipped with a computer 70 performing the overall control thereof, a communication section 71 and a print engine 72. The host device 30 and the printer 40 can be wirelessly communicated with each other via the communication ections 61 and 71. The transmission of the print data from the host device 30 to the printer 40 is performed wirelessly via the communication sections 61 and 71.

The computer 70 is equipped with a CPU 75 (central processing unit), an ASIC 76 (Application Specific IC), a ROM 77, a RAM 78, and a nonvolatile memory 79 as an example of a recording section. In the ROM 77, various programs for realizing various functions of the printer 40 are stored. In the nonvolatile memory 79, other than various programs necessary for various controls of the printer 40, a program for data generation processing which generates print data from three-dimensional image data of a display system (for example, RGB color system) is stored. In this embodiment, the data generation processing for generating the print data from the three-dimensional image data is performed by executing a program by the CPU 65 in the host device 30 or the CPU 75 in the printer 40. Therefore, when selecting and printing an image with the host device 30, the printer driver therein performs data generation processing. On the other hand, when selecting and printing an image with the mobile terminal 20, the CPU 75 in the printer 40 performs the data generating processing therein.

The print engine 72 as shown in FIG. 2 is equipped with a print head 48 (see FIGS. 4 and 5) as an example of a liquid ejection section, and a conveyance motor, etc., as a power source of the conveyance mechanism having a conveyance roller pair 46 (see FIG. 4), etc., for conveying a print medium such as a lens sheet 50 and a sheet, etc., and prints images with the print head 48 while conveying, e.g., the lens sheet 50.

Figure 3:
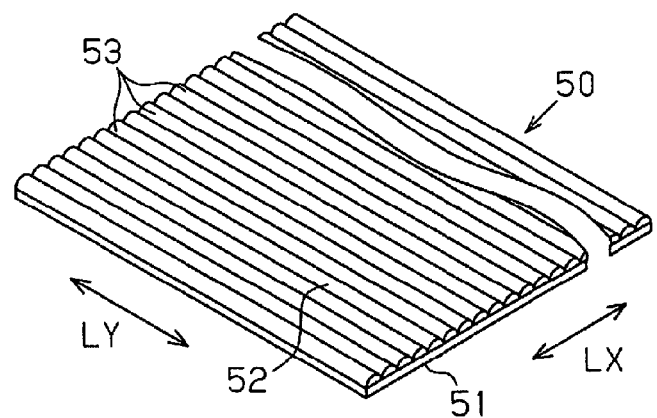
FIG. 3 is a partially broken perspective view of a lens sheet.

As shown in FIG. 3, the lens sheet 50 is equipped with an ink absorbing layer 51 and a lens layer 52. The ink absorbing layer 51 is made of a film formed by a high ink absorbent material and is joined to the back surface on the opposite side of the lens 53 side of the lens layer 52 via an adhesive tape or an adhesive agent having translucency. Of course, the ink absorbing layer 51 can be welded to the back surface of the lens layer 52.

As shown in FIG. 3, in the lens layer 52, a plurality of lenses 53 are formed so as to extend in one direction in parallel with each other in an adjacently arranged manner. The lens layer 52 of this embodiment is a lenticular lens in which the lens 53 is a lenticular lens. The lens 53 has a semicircle shape in cross-section perpendicular to the longitudinal direction. In the following explanation, in the lens sheet 50, in some cases, the longitudinal direction of the lens 53 may be referred to as a "lens longitudinal direction LX," and a direction perpendicular to the lens longitudinal direction may be referred to as a "lens orthogonal direction LY."

Figure 4:
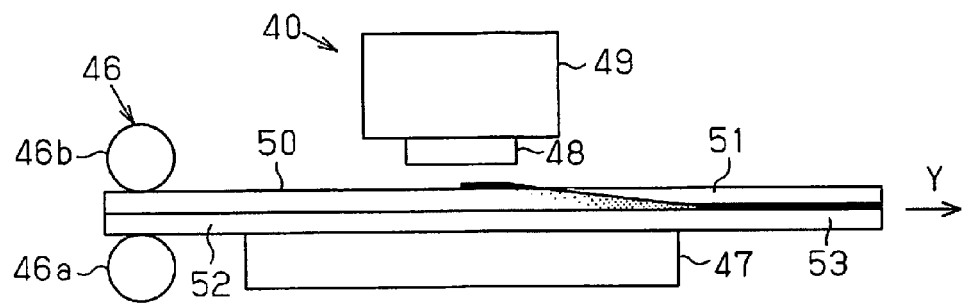
FIG. 4 is a side view showing a structure of a print engine for printing an image on a lens sheet.
Figure 5:
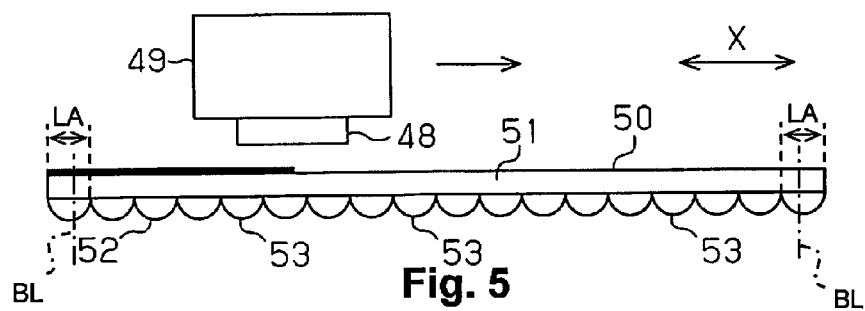
FIG. 5 is a front view showing a structure of a print engine for printing an image on a lens sheet.
Figure 6:
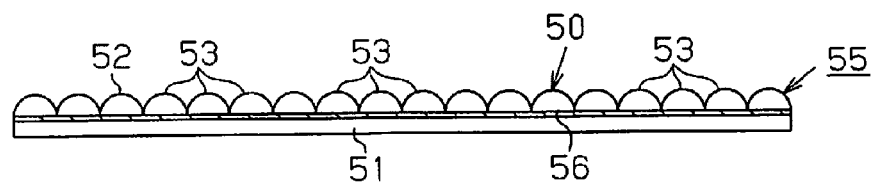
FIG. 6 is a front view showing a three-dimensional image sheet.

FIGS. 4 to 6 explain the formation process of the three-dimensional image sheet 55. A three-dimensional image sheet 55 capable of attaining three-dimensional visualization of an image is formed by printing a three-dimensional image on the back surface of the lens sheet 50. As shown in FIG. 4, the lens sheet 50 set in the feeding section 42 of the printer 40 is fed to the print start position in the main body 41 when printing is initiated. In the main body 41, a conveyance roller pair 46 having a drive roller 46a and a driven roller 46b opposed each other via a conveyor path is arranged. Furthermore, the main body 41, on the downstream side of the conveyance direction Y, is equipped with a support platform 47 supporting a medium such as the lens sheet 50 and a carriage 49 having a print head 48 opposed to the support platform 47 via the conveyor path. Ink drops impact-landed to the back surface of the lens sheet 50 are ejected from the nozzle of the print head 48 on the fed lens sheet 50 to proceed with printing. As shown in FIG. 4, the ink impact-landed on the back surface of the lens sheet 50 is absorbed by the ink absorbing layer 51, permeating to the back surface of the lens layer 52.

As shown in FIG. 5, the printer 40 of this embodiment is a serial printer, and the carriage 49 reciprocates in the main scanning direction X intersecting with the conveyance direction Y. While the carriage 49 is in the middle of moving in the main scanning direction X, ink drops are ejected from the nozzle of the print head 48. Then, the printing operation in which the carriage 49 moves in the main scanning direction X along with ejection of ink drops and an intermittent conveyance movement of the lens sheet 50 in the conveyance direction Y are performed approximately alternately, whereby an image is printed on the back surface of the lens sheet 50. The ink impact-landed on the surface (back surface of the sheet) of the ink absorbing layer 51 permeates to the interface of the ink absorbing layer 51 and the lens layer 52.

In this way, the three-dimensional image sheet 55 as shown in FIG. 6 is produced. As shown in FIG. 6, in the three-dimensional image sheet 55, a three-dimensional image 56 is formed between the ink absorbing layer 51 and the lens layer 52. The three-dimensional image 56 includes a change image in which a plurality of images change sequentially by changing the angle to be observed through the lens 53, and a stereoscopic image in which an object in the image can be observed three-dimensionally by observing an image for left eye and an image for right eye by using a parallax of the left and right eyes via the lens 53.

The three-dimensional image data is constituted by arranging N×M number of division compression images (hereinafter also referred to as "linear image") in a predetermined order in the array direction LX of the lens 53, in which N sheets of images (N is a natural number of 2 or more) are compressed 1/N times in the lens orthogonal direction LX and dividing by the same number as the number of the lenses M.

Figure 7:
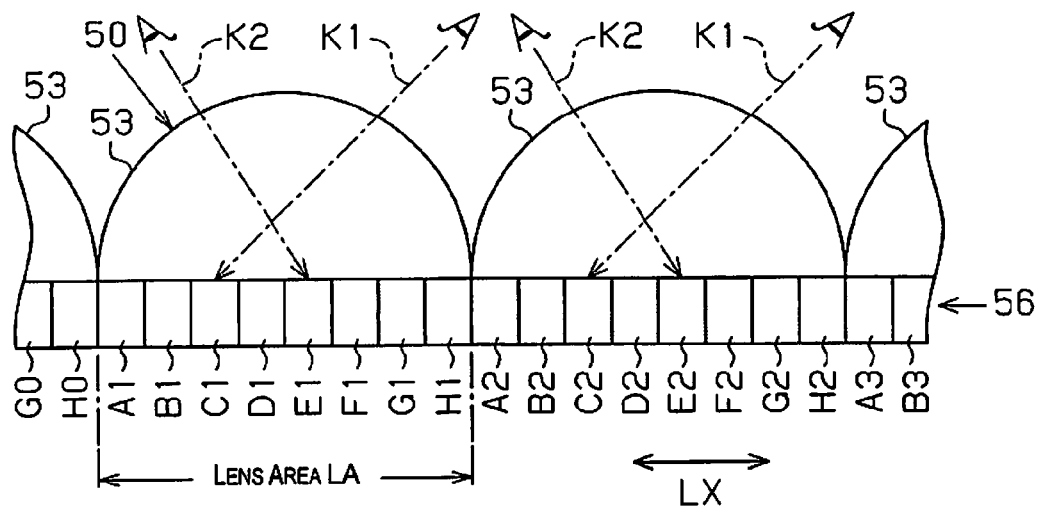
FIG. 7 is an enlarged schematic front cross-sectional view showing a three-dimensional image sheet.

As shown in FIG. 7, in the area within the width of the lens 53 (hereinafter referred to as "lens area LA"), N pieces among N×M pieces of linear images A1 to H1 and A2 to H2, etc., are arranged in the order of changing the images. N pieces (8 sheets, for example) of images are named image A, image B, image C . . . image H, and the corresponding linear images are named linear image A1 to AM, linear image B1 to BM . . . linear image H1 to HM. In the lens area LA, in the lens orthogonal direction LX of N images to be changed, linear images A1, B1 . . . H1 at the same lens position are arranged in the order to be changed. 8 pieces of linear images A1 to H1 are arrayed in the lens area LA of the left side lens 53 as shown in FIG. 7. Then, as shown in FIG. 7, the array direction (left and right direction in FIG. 7) of the linear images Ai, Bi . . . Hi (i=1, 2, 3 . . . M) is the same as the lens orthogonal direction LX. Therefore, hereinafter, the array direction of the linear image in the array direction of the lens 53 may be referred to as the "array direction LX."

In FIG. 7, when observed at a right obliquely upward angle along the line of sight K1, the linear images C1, C2 . . . CM can be observed through each lens 53 and the image C can be observed as a whole. Also, in FIG. 7, when observed at a left obliquely upward angle along the line of sight K2, the linear images E1, E2 . . . EM can be observed and the image E can be observed as a whole. Thus, by changing the observation angle, the image that can be observed changes in the order of images A, B, C . . . H. In addition, in FIG. 7, although a three-dimensional image as a change image is exemplified, the three-dimensional image can be a stereoscope. In a stereoscopic image, for example, M pieces of linear images in which an image for left eye and an image for right eye are compressed 1/N times in the lens orthogonal direction LX is divided by the same number as the lens number are alternately arranged in the lens orthogonal direction LX.

In this embodiment, the functional section of a software is constituted by the computer 60 (especially CPU 65) that executes the program PR in the host device 30. As a functional section, the computer 60 is equipped with a judgment section for determining which area the target area inside the print area PA is in the area in the lens orthogonal direction LX (linear image array direction). Furthermore, the computer 60 is equipped with a first halftone processing section that performs halftone processing under a relatively high resolution dot generation condition when the target area judged by the judgment section is the inner section area IA, and a second halftone processing section that performs halftone processing under a relatively low resolution dot generation condition compared to the inner section area IA when the target area is the end section area EA. Similarly, in a structure in which the computer 70 in the printer 40 executes a program PR, the computer 70 is equipped with a judgment section, a first halftone processing section, and a second halftone processing section as a functional section of the software. Similarly, in a structure in which the computer inside the server 15 executes the program PR, the computer is equipped with a judgment section, a first halftone processing section, and a second halftone processing section as functional sections of the software. In addition, at least one of resolution conversion, color conversion, halftone processing section and rasterize processing can be performed by the image processing circuit in the ASIC 76.

Figure 8:
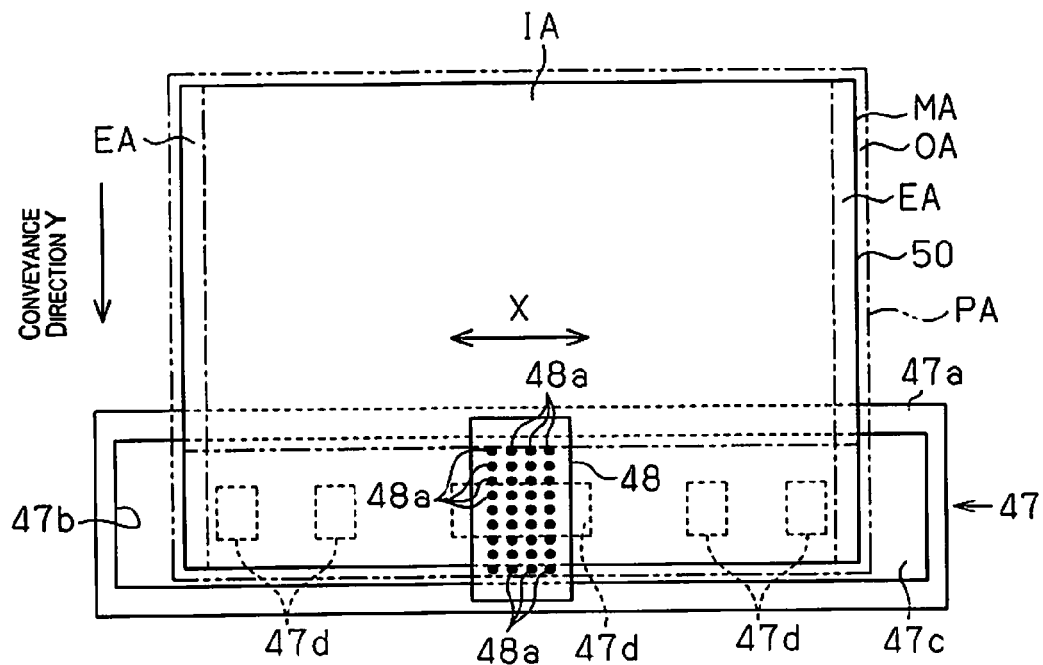
FIG. 8 is a schematic flat view showing a print head for printing on a sheet of a support platform.

FIG. 8 is a plan view showing a support platform, a print head, and a lens sheet (medium). As shown in the drawing, the support platform 47 has an approximately rectangular plate shape extending long in the main scanning direction X and arranged at a position opposed to the print head 48 via the medium conveyance path to support the opposite surface side of the printing surface of a paper or sheet 50. The support platform 47 includes an approximately rectangular plate-shaped substrate 47a, a liquid disposal section 47c in which a liquid absorbing material such as a felt is accommodated in a concave section 47b on the upper surface side of the substrate 47a, and a plurality of protruded portions 47d having an approximately rectangular shape in plan view scattered in island-shapes in the liquid disposal section 47c. The protruded surface 47d are integrally formed with the substrate 47a in a manner protruding from the bottom surface of the concave section 47b and are made of plastic which is the same material as the substrate 47a. The plurality of protruded portions 47d are positioned protruding slightly upward from the upper surface of the liquid disposal section 47c and the sheet 50 passing the upper surface of the support platform 47 is supported by the protruded portions 47d. Therefore, the sheet 50 never comes into contact with the liquid disposal section 47c.

When frameless printing is performed, as shown in FIG. 8, a print area PA larger than the outside of the outer perimeter of the sheet 50 by a predetermined amount is set. Since ink drops are ejected to the print area PA from the nozzles 48a of the print head 48, the entire surface of the sheet without blank spaces can be subjected to printing. At this time, ink drops ejected outside the sheet 50 hit the liquid disposal section 47c and will be absorbed by the felt of the liquid disposal section 47c to be collected.

The plurality of protruded portions 47d, even if any medium size sheet 50 supposed to be used by the printer 40 is conveyed, are set not to be positioned in the overhang area OA which protrudes outwardly in the width direction of the sheet 50 by a predetermined width (for example, a value within 1-10 mm) in the print area PA. Therefore, at the time of frameless printing, in the sheet 50 of an expected size, the ink ejected from the print head 48 will not hit the protruded portions 47d. On the support platform 47, discarding holes that are not illustrated are formed at the position corresponding to the overhang areas OA in the print area PA. The ink drops ejected outwardly in the width direction of the sheet 50 in the print area PA are discarded in the discarding holes. It should be noted that FIG. 8 is a schematic diagram and the number of the protruded portions 47d and the width and intervals of the protruded portions 47d in the longitudinal direction of the support platform 47, etc., are not accurate.

The plurality of nozzles 48a of the print head 48 (for example, 180 or 360 pieces) are formed in the conveyance direction Y (up-and-down direction of FIG. 8) and form the same number of nozzle arrays as the number of colors of the ink. In the moving process of the print head 48 in the main scanning direction X, it is possible to eject inks in the range of the length of the nozzle array in the conveyance direction Y.

Next, the area for determining the print dot condition when subjecting the sheet 50 to frameless printing will be explained with reference to FIG. 9. When an image is printed on the sheet 50 in frameless printing, the print area PA in which ink drops are ejected to print an image his set to be larger in both the lens orthogonal direction LX and the lens longitudinal direction LY than the medium area MA which is the area of the sheet 50. Also, the print area PA includes a medium area MA which is the area of the sheet 50 and an overhang area OA of a predetermined width Lo set along the outer perimeter outside the medium area MA. The predetermined width Lo is a predetermined value within 1-10 mm, for example.

In the printer 40 of this embodiment, the print head 48 can selectively eject ink drops among three types of dot sizes, large, medium and small. In the end section area EA set in advance on both sides of the lens orthogonal direction LX (linear image array direction) in the print area PA, the ink drops are ejected from the nozzles 48a of the print head 48 under a condition in which the ejection ratio of small dots is lowered. In other words, in the end section area EA, ink drops are ejected from the nozzles 48a of the print head 48 under a condition in which the ejection ratio of large dots are increased. Especially in this embodiment, when ink drops are ejected from the nozzles 48a toward the end section area EA, the print head 48 is set such that the ejection ratio of small dots is decreased and the ejection ratio of large dots is increased and large drops capable of only forming largest large dots among the ejectable dot sizes of the print head 48 are ejected.

In the print area PA, in the inner section area IA excluding the end section area EA, ink drops of sizes capable of forming plural types of dot sizes (2 types or 3 types) are ejected. In this embodiment, in the lens longitudinal direction LY (linear image longitudinal direction) of the print area PA, the inner section area IA is set along the entire areas of both ends. Therefore, in the inner section area IA in the print area PA, in the lens longitudinal direction LY, large dots are not formed even at the end sections.

The width Le of the end section area EA is set to be a predetermined value within the range of 5-20 mm. The width Le of the end section area EA includes the width Lo of the overhang area OA. In this embodiment, for example, the width Le of the end section area EA is set to around 10 mm, and the width Lo of the overhang area OA is set to around 5 mm. Here, in this embodiment, the relationship is Le>Lo. Therefore, in the sheet end area SE positioned at the end section of the sheet 50 having a width Ls=Le−Lo, printing is performed with large dot ink drops.

Figure 9:
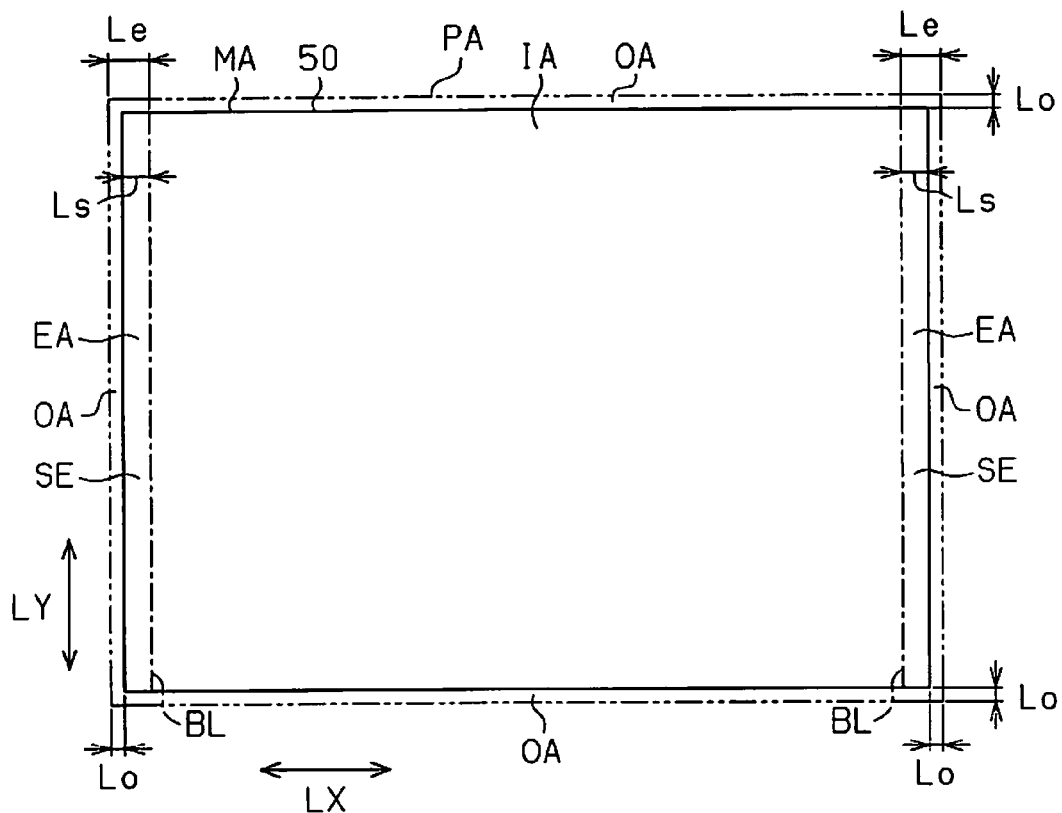
FIG. 9 is a plan view showing each area set in the lens sheet.

It is preferable that the boundary BL of the end section area EA and the inner section area IA as shown in FIG. 9 is positioned so as to be dislocated from the boundary of the lens area LA (see FIG. 7). Since the area drawn only with large dots can easily blot in comparison to the area drawn with small and medium dots, when the boundary BL is located at the boundary of the lens area LA, for example, blotting is likely to occur at the border part of the linear image H1 and the linear image A2 (see FIG. 7) arranged in an adjacent manner on both sides of the boundary of the lens area LA. In this case, when observing the image A via the lens layer 52, because of the blotting of the large dots, the image H farthest from the image A which is the observation target is observed. On the other hand, if the boundary BL is located at the inner side of the lens area LA, when observing the image B via the lens layer 52, even though the image A or C adjacent to the image B which is the observation target is observed because of the blotting of the large dots, the farthest image H is less likely to be observed.

In the printer 40, as the print modes, a high-speed printing mode prioritizing the print speed rather than the print image quality (normal print mode), a high image quality mode prioritizing the print image quality rather than the print speed, and a super high image quality mode capable of handling three-dimensional image printing are prepared. In the high-speed printing mode, printing is performed with large dots. In the high image quality mode, a plurality of sizes of dots (large, medium and small in this example) is selectively used for printing an image. In the super high image quality mode, relatively small size dots other than the large dots among a plurality of sizes (medium dots and small dots in this example) are selectively used to perform the printing of an image.

In other words, drawing in the end section area EA is printed under the same dot size condition as the high-speed printing mode and drawing in the inner section area IA is printed using a plurality of dots (e.g., two types, medium and small) that are comparatively smaller in size under the same dot size condition as the super high image quality mode.

Figure 10A:
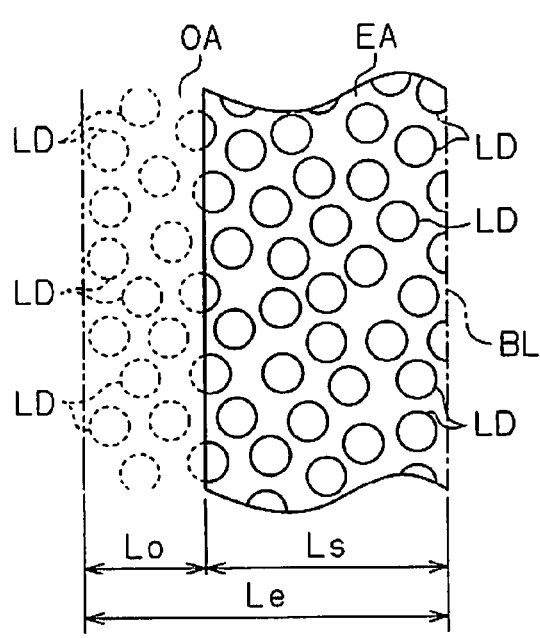
FIG. 10A is a schematic plan view showing a condition of dots in an end section area.

FIGS. 10A and B are drawings for explaining the dot size condition per area. As shown in FIG. 10A, in the print area PA, in the end section area EA set on both sides of the linear image array direction (lens orthogonal direction LX), the image is drawn with large dots LD. Therefore, the overhang area OA included in the end section area EA is drawn with large dots LD.

Figure 10B:
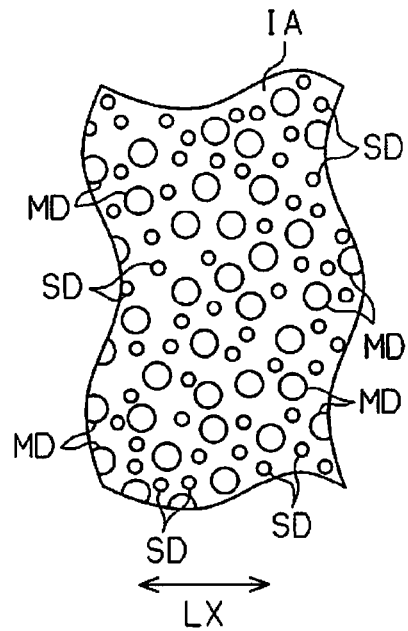
FIG. 10B is a schematic plan view showing a condition of dots in the inner section area.

On the other hand, as shown in FIG. 10B, in the inner section area IA which is a majority area excluding the end section area EA in the linear image array direction LX in the print area PA, images are drawn using two types of dot sizes, medium dots MD and small dots SD.

Next, using FIG. 11, the function structure of the mobile terminal 20, the host device 30 and the printer 40 constituting the print system 11 will be explained.

In the mobile terminal 20, a preview processing section 23 is provided in the computer (not illustrated) for executing a program PR as a functional section made of software. The preview processing section 23 previews a three-dimensional image observed via a number of lenses 53 based on the image data GD stored in the nonvolatile memory 24 on the display section 21 (see FIG. 1).

After the user checks the three-dimensional image in the preview and is okay with it, the user gives an instruction to execute the printing by operating the mobile terminal 20. In addition, when there is a necessary storage area in the nonvolatile memory 24 of the mobile terminal, a program PR similar to the host device 30 described later can be stored and a host function can be provided to the mobile terminal 20.

Figure 11:
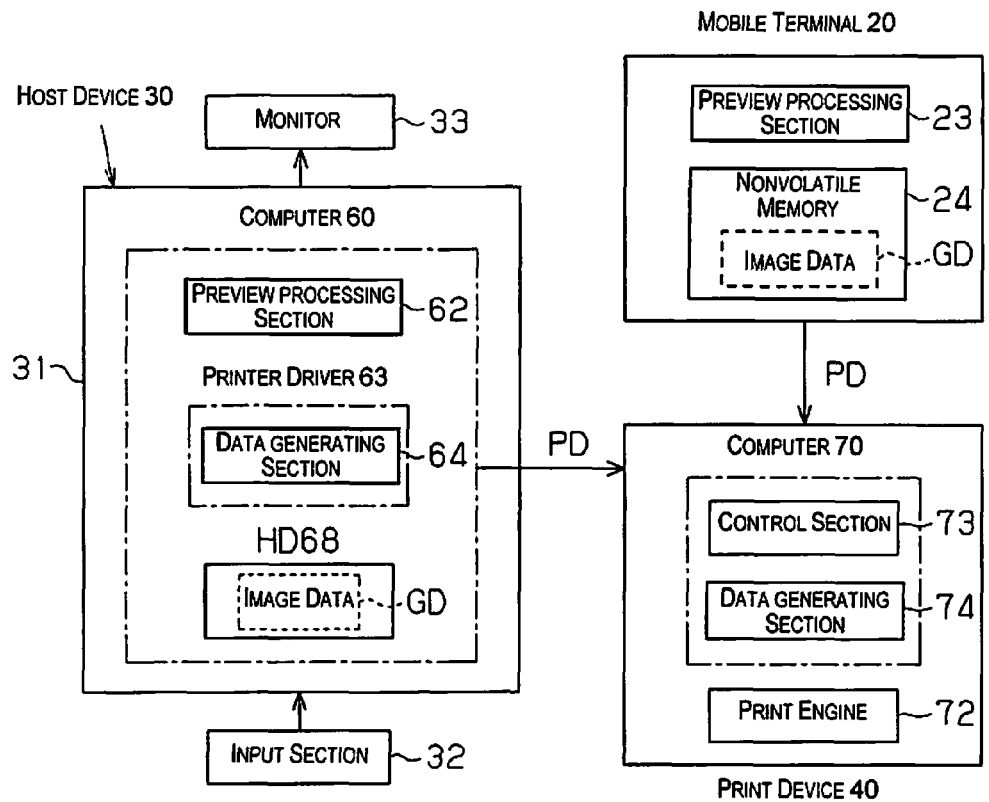
FIG. 11 is a block diagram showing a functional structure of a print system.

The main body 31 of the host device 30 shown in FIG. 11 is equipped with a preview Processing section 62 and a printer driver 63 as functional sections made of software, as provided for making the computer 60 execute a program PR for the printer driver stored in a HD 68 (see FIG. 2). The preview processing section 62 has the same functions as the preview processing section 23 of the mobile terminal 20 and previews a three-dimensional image based on the image data GD stored in the HD 68. Also, the printer driver 63 is equipped with, e.g., a data generation section 64 which converts a RGB color system image data GD to a CMYK color system print data PD. For example, if an operation for a print order is performed using an input section 32 (keyboard and mouse, etc.), the image data GD stored in the video buffer (not illustrated) is converted to print data PD by the data generation section 64 of the printer driver 63 and the print data PD is forwarded to the printer 40.

Furthermore, the printer 40 shown in FIG. 11 is equipped with a controller 73 and a data generation section 74 as functional sections made of software, as provided by making the computer 70 execute a program PR stored in the nonvolatile memory 79 (see FIG. 2). The controller 73 controls the print engine 72. Also, the data generation section 74 basically has the same structure as the data generation section 64 in the printer driver 63, and for example, it converts the RGB color system image data GD received from, for example, the mobile terminal 20 to a CMYK color system print data PD.

Next, the details of the data generation sections 64 and 74 are explained with reference to FIG. 12.

Figure 12:
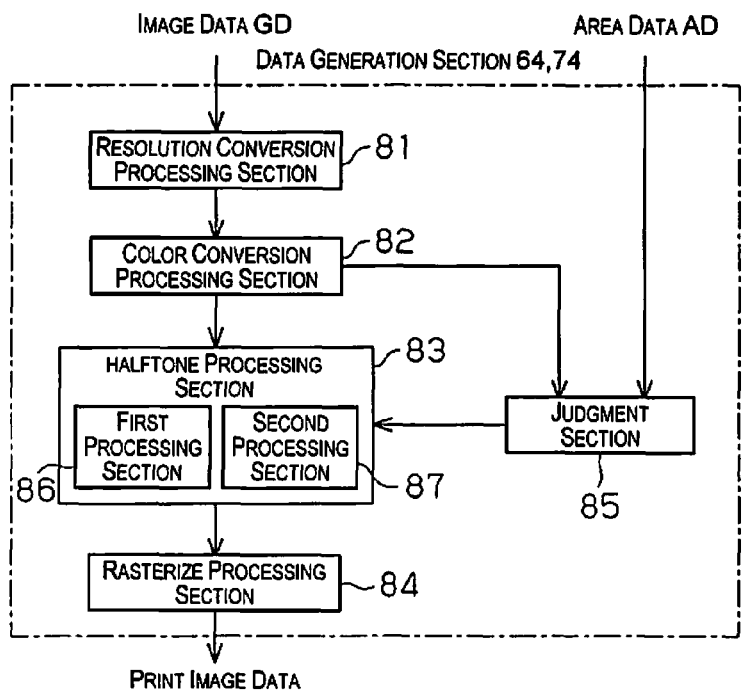
FIG. 12 is a block diagram showing a detailed structure of a data generation section.

As shown in FIG. 12, the data generation sections 64 and 74 are equipped with a resolution conversion processing section 81, a color conversion processing section 82, a halftone processing section 83, a rasterize processing section 84, and a judgment section 85.

The resolution conversion processing section 81 converts the resolution of the image data GD of the print target to the print resolution determined from the dot pitch, etc., of the printer 40 at the time of printing. The color conversion processing section 82 receives the image data from the resolution conversion processing section 81 and performs color conversion processing to convert the RGB gradation value image data to a CMYK gradation value data used in the printer 40. The color conversion processing is performed while referring to the color conversion table (look-up table) (not illustrated).

The halftone processing section 83 receives CMYK image data after the color conversion processing and performs the halftone processing of converting to CMYK dot data of a certain gradation displayable by the printer 40. In this embodiment, three types of the number of gradations for performing the halftone processing are prepared. The three types include 2 gradations, 3 gradations and Q gradations (Q is a natural number of 4 or more).

The halftone processing section 83 is equipped with a first processing section 86 (first halftone processing section) which converts to CMYK dot data of 3 gradations, a second processing section 87 (second halftone processing section) which converts to CMYK dot data of 2 gradations, and a third processing section (third halftone processing section) which converts to CMYK dot data of Q gradations (e.g., 4 gradations) which is not illustrated.

The first processing section 86 subjects the CMYK image data after color conversion processing to the first halftone processing to convert it to 3 gradation CMYK dot data. By the 3 gradations of dot data, three conditions can be distinguished, that is, two types of dot sizes, medium and small sizes (ink ejection amount) and a state in which dots are not formed.

The first processing section 86 is used for, e.g., a super high image quality mode. For example, at the time of printing on the lens sheet 50, a super high image quality mode is set and the first processing section 86 is used. In this embodiment, in the image section printed in the inner section area IA in an area inward the linear image array direction LX (lens orthogonal direction) than the end section area EA in the print area explained later to which the ink may be ejected from the nozzles of the print head 48, the first processing section 86 performs a conversion to CMYK dot data of 3 gradations.

On the other hand, the second processing section 87 subjects the CMYK image data after color conversion processing to the second halftone processing to thereby convert it to CMYK dot data of 2 gradations. In the dot data of 2 gradations, there are two distinguished states depending on the existence of dot formation. In this case, the dot size (ink ejection amount) is large. For example, in a high-speed printing mode, it is converted to CMYK dot data of 2 gradations. Also in this embodiment, when printing an image on the lens sheet 50, the image portion for printing in the end section area EA set on both end sections of the lens orthogonal direction LX in the print area PA described later is converted to CMYK dot data of 2 gradations.

The third processing section not shown in the drawing converts to CMYK dot data of an arbitrary number of gradations among, e.g., 3 to 10 gradations as Q gradations. In this embodiment, Q gradations is 4 gradations, and from the dot data of 4 gradations, four conditions can be distinguished, that is, three types of dot sizes, large, medium and small ink ejection amount) and a state in which dots are not formed. The third processing section is used for, e.g., a high image quality mode. For example, when a high image quality mode is set for printing on a photograph paper, the third processing section is used.

In addition, the number of the gradations of the dot data generated by the first processing section 86 can be Q gradations and Q gradations halftone processing can be performed in the inner section area IA at the time of printing on the lens sheet 50.

The judgment section 85 determines the processing target area to be processed next by the halftone processing section 83 based on the processing data information (data address, etc.) from the color conversion processing section 82 and the area data AD. The area data AD is information capable of identifying the position of the inner section area IA and the end section area EA as shown in FIG. 9. The area data AD, when the address of the data of the processing object is known, is reference data capable of identifying whether the data identified by the address belongs to either the inner section area IA or the end section area EA. The halftone processing section 83, based on the judgment result input from the judgment section 85, selects the first processing section 86 when the processing target area is the inner section area IA and selects the second processing section 87 when the processing target area is the end section area EA as the destination of the next processing target data.

The rasterize processing section 84 receives the dot data for ink dots for each color from the halftone processing section 83 and performs the process of rearranging the Q gradation dot data into the order of forwarding to the printer 40 in consideration of the dot formation order by the print head 48.

The data generation section 64 on the host device 30 side is equipped with a command generation section (not illustrated) for generating the print commands to be attached to the print image data after the rasterize processing. The host device 30 forwards the print image data as print data PD, in which a print command is attached to the header, to the printer 40 by, e.g., a packet communication.

The print image data is binary data in which 1 dot (pixel) is expressed by F bit (F is the smallest natural number satisfying ($Q \leq 2^F$)). In this example, data in which the print image data is 3 gradations or more is binary data in which 1 dot is expressed in 2 bits. A large dot is expressed as "11," a medium dot is expressed as "10," a small dot is expressed as "01," and no dot (no ejection) is expressed as "00."

The CMYK data generated by the first processing section 86 is constituted by the dot value "10" (medium dot) and "01" (small dot) and "00" (no dot). The CMYK data generated by the second processing section 87 is constituted by the dot value "11" (large dot) and "00" (no dot).

Figure 13:
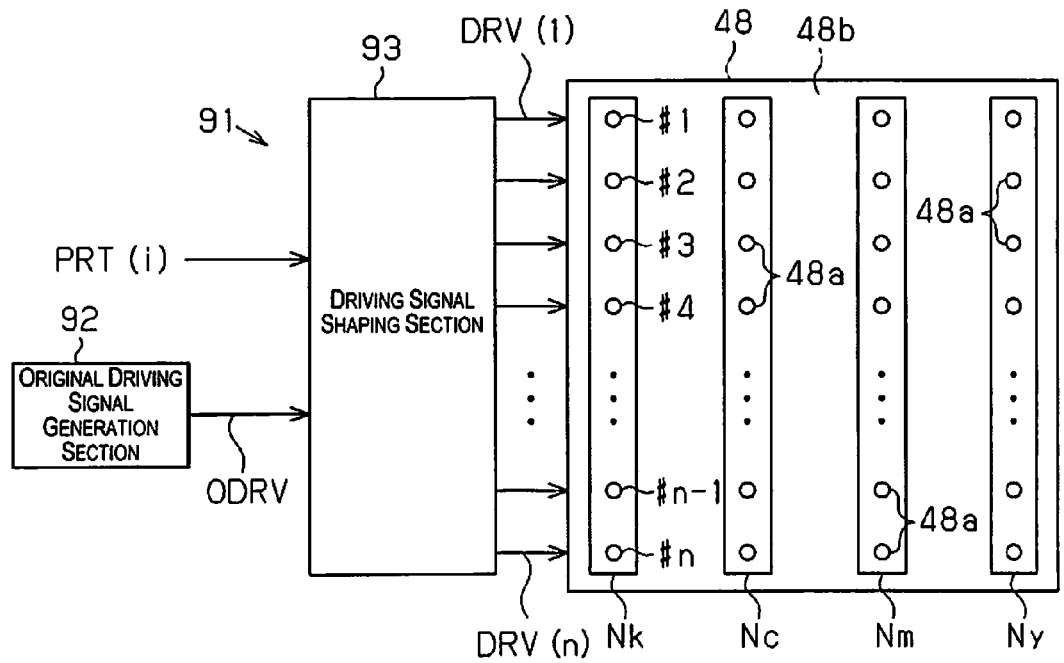
FIG. 13 shows a drive system of a print head.

FIG. 13 shows a drive control section for drive controlling the print head 48. As shown in FIG. 13, on the lower surface of the print head 48, a plurality (4, for example) of nozzle arrays Nk, Nc, Nm, and Ny are formed. Each nozzle array is equipped with n numbers of nozzles 48a (n=180, for example) for ejecting ink of each color, cyan (C), magenta (M), yellow (Y), and black (K). The print head 48 is fixed in a state in which the nozzle forming face 48b faces downward on the lower section of the carriage 49. The print head 48 moves together with the carriage 49 moving in the main scanning direction X and ejects ink drops from the nozzles 48a at predetermined positions based on the print data. In the print head 48, piezo elements (not illustrated) as drive elements for ejecting ink drops are provided for every nozzle 48a. In the following explanation, n numbers of nozzles 48a are described as nozzle #1 to #n.

The drive control section 91 shown in FIG. 13 controls the size of ink drops ejected by the print head 48 based on the print image data. The drive control section 91 is equipped with a print signal generation section (not illustrated) for generating a print signal PRT (i) to be output to the drive circuit of the print head 48 based on the pixel data of the print image data and a drive circuit of the print head 48. The drive circuit of the print head 48 is equipped with an original driving signal generation section 92 and a driving signal shaping section 93. In this embodiment, the drive circuit for such nozzles #1 to #n is provided for each nozzle array, and the driving of piezo elements are performed for individual nozzle arrays. The number inside the parentheses at the end of each signal name in the drawing refers to the nozzle number to which the signal is supplied.

The piezo element, when a voltage of a predetermined time width is applied between the electrodes provided on both sides, stretches according to the applied time of the voltage and deforms the side walls of the ink channel. In this way, the ink captured when the volume of the ink channel expands according to the stretching of the piezo element is ejected at the time of compression, thereby becoming ink drops to be ejected from each nozzle #1 to #n of each color.

The original driving signal generation section 92 generates an original signal ODRV commonly used in each nozzle #1 to #n. The original signal ODRV is a signal including a plurality of pulses within a time in which the carriage 49 (see FIG. 5) crosses the interval of one pixel. To the driving signal shaping section 93, an original signal ODRV is input from the original driving signal generation section 92 and a print signals PRT (i) is also input. The driving signal shaping section 93 shapes the original signal ODRV according to the level of the print signal PRT (i) and outputs as driving signals DRV (i) to piezo elements of each nozzle #1 to #n. The piezo element of each nozzle #1 to #n is driven based on the driving signal DRV from the driving signal shaping section 93.

Figure 14:
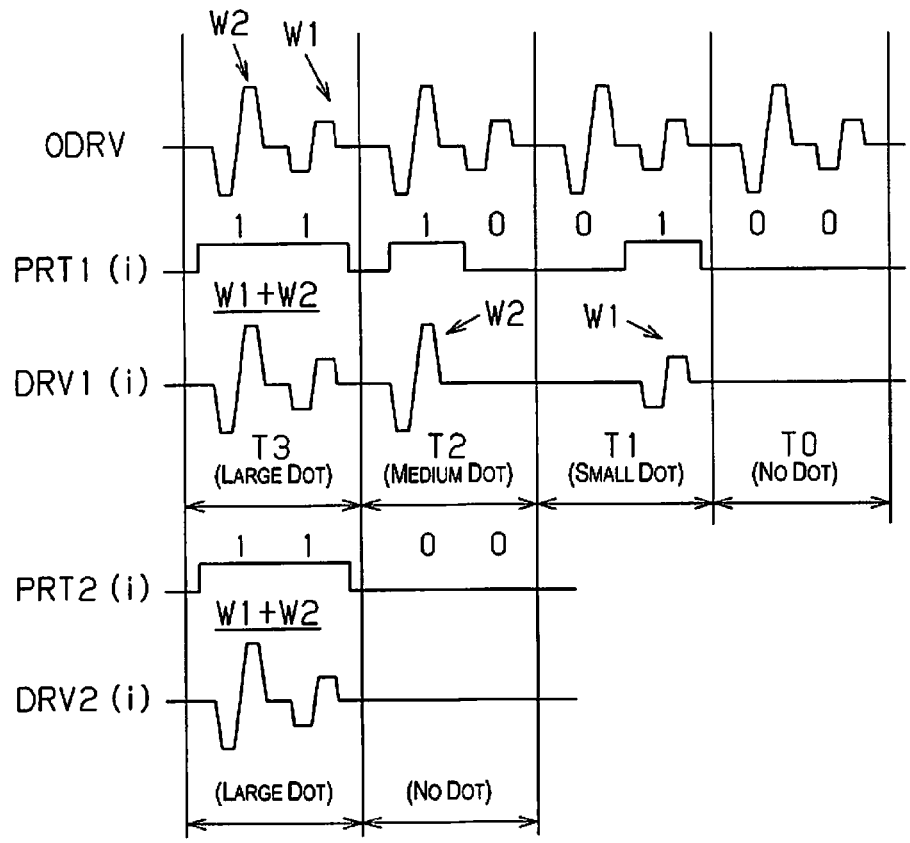
FIG. 14 is a signal waveform diagram of a control to selectively set a dot size of a print head.

FIG. 14 is a timing chart for explaining each signal. That is, the drawing shows the timing chart of each signal, the original signal ODRV, the print signal PRT (i), and the driving signal DRV (i).

In this embodiment, the original signal ODRV includes two pulses, a first pulse W1 and a second pulse W2 within a time in which the carriage 49 crosses the interval of one pixel.

When the print signal PRT (i) is 1 level, the driving signal shaping section 93 passes the pulse corresponding to the original signal ODRV as it is as the driving signal DRV (i). On the other hand, when the print signal PRT (i) is 0 level, the driving signal shaping section 93 intercepts the pulse of the original signal ODRV.

When the print signal PRT (i) corresponds to the 2 bit data "11," the first pulse W1 and the second pulse W2 are output in one pixel area. In this way, a large size ink drop is ejected from the nozzle and a large dot is formed on the sheet 50. Also, when the print signal PRT (i) corresponds to the 2 bit data "10," only the second pulse W2 is output in the first half of one pixel area. In this way, a medium size ink drop is ejected from the nozzle and a medium size dot (medium dot) is formed on the sheet 50.

Also, when the print signal PRT (i) corresponds to the 2 bit data "00," neither the first pulse W1 nor the second pulse W2 is output in one pixel area. In this way, ink drops of any size are not ejected from the nozzle and no dot is formed on the sheet 50. As explained above, the driving signal DRV (i) in one pixel area is shaped so as to have four types of different waveforms corresponding to four different values of the print signal PRT (i).

Also, when performing the halftone processing in the first processing section 86, only the dot data "10," "01" and "00" are formed. Therefore, when the print signal PRT (i) is "10," the medium ink drop is ejected from the nozzle, and the small ink drop is ejected from the nozzle when "01", and the ink drop is not ejected from the nozzle when "00." Also, as shown on the lower side of FIG. 14, when performing the halftone processing in the second processing section 87, only the dot data "11" and "00" are formed. Therefore, when the print signal PRT (i) is "11," a large ink drop is ejected from the nozzle, and no ink drop is ejected from the nozzle when "00."

Next, the functions of the host device 30 and the printer 40 will be explained using FIG. 15. Hereinafter, the ejection control routine will be explained according to the flow chart shown in FIG. 15. When the user prints an image including a three-dimensional image with the printer 40, the print data PD (RGB color system image data GD) may be transmitted to the printer 40 from the mobile terminal 20 or the print data PD (CMYK color system image data) may be transmitted from the host device 30. Since the ejection control routine of the host device 30 is basically the same as the ejection control routine in the printer 40, in the following explanation, the explanation will be made by exemplifying the ejection control routine in which the computer 70 executes a program PR when the printer 40 receives the print data PD from the mobile terminal 20.

Image data GD downloaded from the server 15 in advance is stored in the mobile terminal 20. The image data GD is image data including a three-dimensional image. When printing an image to the lens sheet 50, the user operates the mobile terminal 20 to set the print condition. The print conditions include, for example, print mode (high image quality/low image quality), print color (color/gray scale), types of print medium (normal paper, photograph, postcard, lens sheet, etc.) and size (A4 size, B5 size, L size, etc.). When printing on the lens sheet 50, the user selects a super high image quality mode as the print mode. Afterward, the user performs the operation to instruct the execution of the printing on the mobile terminal 20. The mobile terminal 20 that received the instruction transmits the print data (image data GD) to the printer 40.

In Step S11, image data is obtained. A three-dimensional image is included in the image data GD.

In Step S12, the image data is subjected to resolution conversion processing. That is, the computer 70 converts the image data GD which is the resolution for displaying to a print resolution according to the print mode set in the printer 40.

In Step S13, the image data after resolution conversion processing (for example, RGB image data) is subjected to color conversion processing. The computer 70 refers to the look-up able prepared in advance to perform the color conversion processing converting the RGB color system image data GD to CMYK color system image data.

In Step S14, when executing the next halftone processing, an area judgment for determining which processing target area belongs to which area in the print area PA is performed. The area judgment determines which area is subjected to the halftone processing by referring to the area data AD by the judgment section 85. If the area is the inner section area IA, the routine proceeds to Step S15, and if the area is the end section area EA, the routine proceeds to Step S16.

In Step S15, the first processing section 86 performs the 3 gradation halftone processing. As a result, in the inner section area IA, dots are generated using two types of dot sizes, a medium dot MD and a small dot SD (see FIG. 10B). In addition, when halftone processing of Q gradations (Q≥4) is set for the inner section area IA, for example, dots are generated using (Q−1) types of dot sizes (e.g., three types, large, medium and small when Q=4).

In Step S16, the second processing section 87 performs the 2 gradation halftone processing. As a result, in the end section area EA, dots are generated using only large dots LD (see FIG. 10A).

In Step S17, the computer 70 performs the rasterize processing, that is, the computer 70 subjects the CMYK image data after halftone processing to the rasterize processing, and generates the print image data by rearranging the dot data in the order in which the dots are used in the drive circuit of the print head 48.

In Step S18, the print data is output to the print head 48. In other words, the computer 70 transmits to the printer 40 the print data PD generated by attaching a header including a section of the print condition to the print image data.

The print image data received by the printer 40 is input to the drive circuit of the print head 48. The drive circuit generates the print signal PRT (i) according to the pixel data of the print image data and the generated print signal PRT (i) is input to the driving signal shaping section 93. Also, the original signal ODRV from the original driving signal generation section 92 is input to the driving signal shaping section 93. DRV (i) is input to each piezo element corresponding to each nozzle #1 to #n.

In the inner section area IA in the print area PA, the print signal PRT (i) corresponding to the pixel data in the print image data generated by the 3 gradation halftone processing selects one of the three types, "10, "01," or "00." Therefore, the ink drops are ejected from the nozzles of the print head 48 under the dot formation condition using two kinds of small and medium size dots.

On the other hand, in the end section area EA in the print area PA, the print signal PRT (i) corresponding to the pixel data in the print image data generated by the 2 gradation halftone processing selects one of the two types, "11" or "00." Therefore, ink drops are ejected from the nozzles under the dot formation condition using only large dots. In other words, in the end section area EA, the ink drops are ejected under a condition in which relatively low resolution dot sizes are used in comparison to the inner section area IA in which ink drops are ejected under a condition in which high resolution dot sizes are used.

As a result of such ejection control, as shown in FIG. 10B, in the inner section area IA, an image is drawn in a relatively high resolution using medium dots and small dots. Also, as shown in FIG. 10(a), in the end section area EA, an image is drawn in a relatively low resolution using large dots.

Here, printing on the lens sheet 50 is frameless printing to print on the peripheral edge of the sheet without blank sections. Therefore, the print area PA is set to be large by the width Lo of the overhang area OA on the outside of the medium area MA. The end section area EA includes the end section area SE of the lens sheet 50. Therefore, large ink drops are ejected when drawing an image in the end section area SE of the sheet 50. Even if the position of the sheet 50 is slightly dislocated in the lens orthogonal direction LX, the image can be drawn completely to the end section of the sheet 50 since there is an overhang area OA.

If it is configured such that large ink drops are ejected only for the overhang area OA to reduce mists, if the sheet 50 is slightly dislocated in the lens orthogonal direction LX (main scanning direction X in the example of FIG. 5), at the end section on the opposite side of the dislocated direction, medium ink drops and small ink drops are ejected from the nozzles similarly to the inner section area IA to the area of the amount of the dislocated width to the outside. In this case, among the medium ink drops and the small ink drops ejected toward the outside of the sheet 50, small ink drops especially become the cause of generation of mists. This is because, if the distance of the ejection direction after the ejection is relatively shorter than the gap to the sheet surface, relatively light ink drops would land on the sheet 50 at a higher rate, but if they go off to the outside of the sheet 50, the distance to the surface of the liquid disposal section 47c (see FIG. 8) of the support platform 47 is longer, thereby making it more likely for the ink drop to drift and become ink mists before reaching the surface.

On the other hand, in this embodiment, since large ink drops are ejected onto the end section area SE of the sheet 50, even if the position of the sheet 50 is slightly dislocated in the lens orthogonal direction LX (main scanning direction X), large ink drops are always ejected to the outside of the sheet 50. Therefore, ink mists are hardly generated.

Also, the resolution of the sheet 50 in the lens orthogonal direction LX is determined by the pitch of the lens 53, so the resolution is originally lower in comparison to the lens longitudinal direction LY. Therefore, even if the end sections of the sheet 50 in the lens orthogonal direction LX is drawn with large dots, the reduction in image quality is barely noticeable. In other words, since the end section area SE of the sheet 50 in the linear image array direction LX is drawn with large dots by ejecting large ink drops from the nozzle, the reduction in image quality is not very noticeable under the consideration.

Figure 15:
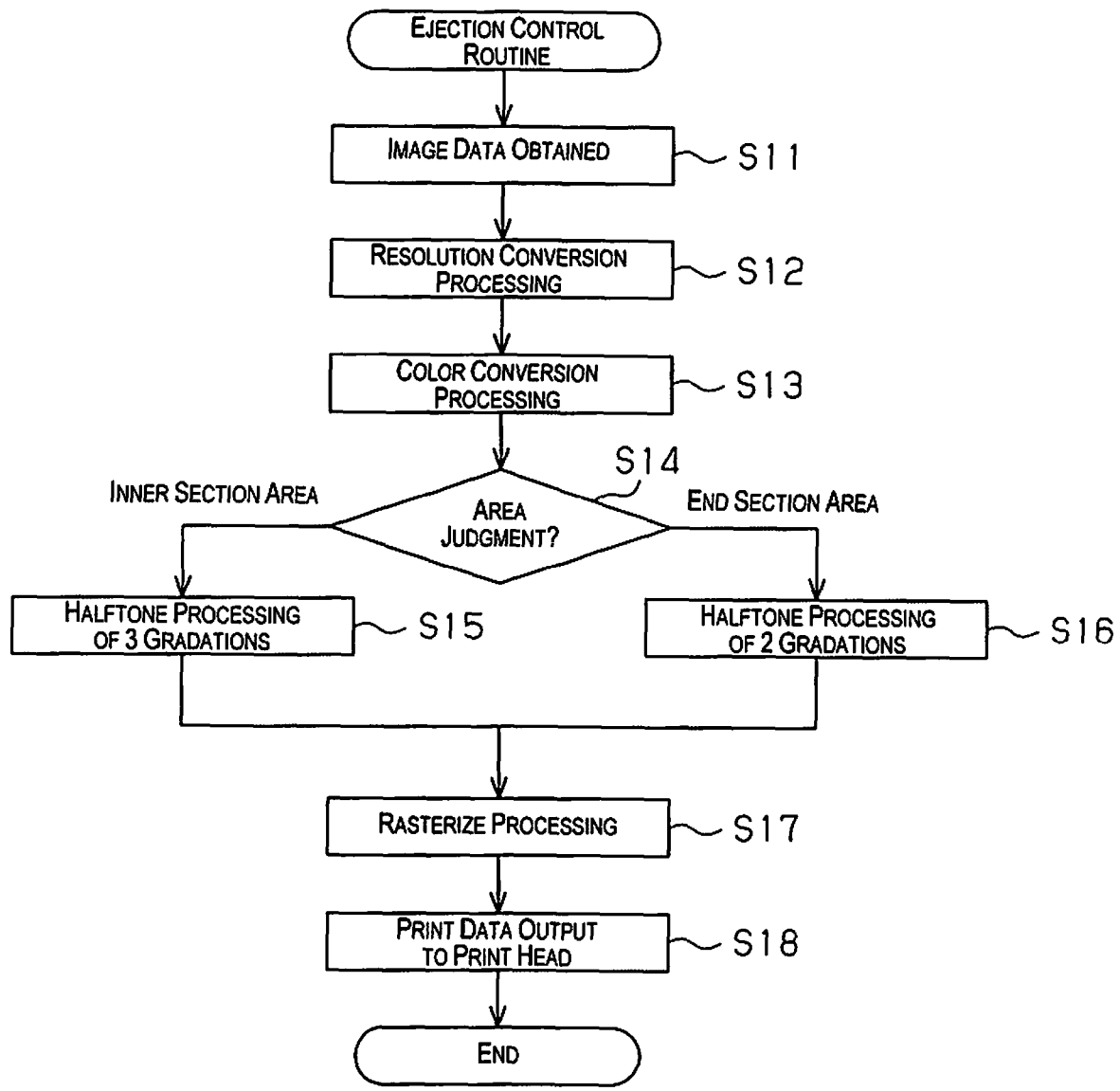
FIG. 15 is a flow chart showing an ejection control routine.

In addition, in case where print data PD is transmitted to the printer 40 from the host device 30, the processes of Steps S11 to S17 in FIG. 15 will be performed by the computer 60 (especially CPU 65) in the host device 30 which executes the program PR. Also, by transmitting the generated print data PD to the printer 40 by the computer 60 of the host device 30, the print data PD is output to the drive circuit of the print head 48 (S18).

According to the embodiment explained above, the following effects can be obtained.

(1) When printing an image including a three-dimensional image in which a plurality of linear images are arrayed onto a lens sheet 50, in the end section area EA of the print area PA of the image in the linear image array direction LX (lens orthogonal direction), the print head 48 ejects a liquid by lowering the ejection ratio of relative small dots than the inner section area IA. Therefore, the ejection ratio of the small dots ejected to the overhang area OA on the outside of the end section of the sheet 50 in the linear image array direction LX is lowered, thereby reducing mists. Also, since the linear image array direction LX is the array direction of the lens 53 (lens orthogonal direction LX) and is a direction in which the resolution decreases depending on the lens width when the three-dimensional image is observed through the lens 53, even though the rate of the formation of relative large dots is increased, the decrease in resolution in the end section area SE of the sheet 50 when the three-dimensional image is observed through the lens 53 is hardly noticeable.

(2) The medium is a lens sheet 50 having a lenticular lens. Under the consideration that the ejection ratio of small dots ejected to the overhang area OA outside the end section of the lens sheet 50 in the linear image array direction LX is reduced and the mists are reduced and that the formation ratio of relatively large dots in the end section area SE of the sheet 50 is increased, the reduction of the resolution of the end section area SE when a three-dimensional image is observed via the lens 53 is hardly noticeable.

(3) In the end section area EA of the print area PA, the print head 48 ejects ink by increasing the ejection ratio for dots larger than the inner section area IA. That is, the ejection ratio of large dots is higher in the end section of the lens sheet 50 in the lens orthogonal direction LX and the overhang area OA outside thereof. As a result, the amount of generation of mists can be reduced and the reduction in resolution of the end section area SE in the lens array direction (linear image array direction) when a three-dimensional image is observed via the lens layer 52 is hardly noticeable.

(4) The print area PA is larger than the medium area MA at least in the lens orthogonal direction LX (linear image array direction). Therefore, in the overhang area OA protruding outside the medium area MA in the print area PA, with the formation ratio of small dots reduced (that is, increasing the formation ratio of large dots in the case of this embodiment), the ink is ejected. Therefore, the mists caused by ink drops ejected to the overhang area OA outside the sheet 50 can be reduced.

(5) In the end section area EA, the print head 48 ejects large dots, which is the largest dot size among the ejectable dot sizes. Therefore, mists can be more effectively reduced.

(6) In the lens longitudinal direction LY (linear image longitudinal direction) of the print area PA, the inner section area IA is set in the entire area reaching both ends. Therefore, in the inner section area IA, the images can be printed at a high resolution to the end section in the longitudinal direction of the lens sheet 50. When the lens layer 52 is a lenticular lens, for example, when a three-dimensional image is observed through the lens layer 52, the central section of the image can be observed in a relatively high resolution in the entire longitudinal direction of the lens 53 up to both ends.

(7) To generate the print data for printing a three-dimensional image to a medium (ink absorbing layer 51) disposed so as to face the lens layer 52 having a plurality of lenses 53 using the printer 40, the program PR to be executed by the computer 60 and 70 is stored in at least one of the host device 30, HD 68, and the nonvolatile memory 79 of the printer 40. The program PR is equipped with a Step for determining whether or not the target area in the print area PA of the image belongs to either the end section area EA or the inner section area IA. Also, when the target area is the inner section area IA, the program PR includes a first step for subjecting the corresponding area of the image to a first halftone processing (3 gradations or Q gradations halftone processing) for generating dots under a high resolution dot size condition. Furthermore, when the target area is the end section area EA, the program PR includes a second step for subjecting the corresponding area of the image to a second halftone processing (2 gradations or Q gradations halftone processing) for generating dots under a dot formation condition in which the formation ratio of relatively small dots is lower than the first halftone processing. Also, by executing the program PR with the computer 60 and 70, the print data PD or printing using the printer 40 can be provided. In addition, the program PR can be executed by a computer inside the server 15, and in this case, the print data PD generated by the computer is transmitted to the printer 40 via the Internet NW from the server 15. Furthermore, the program PR can be stored in the nonvolatile memory 24 of the mobile terminal 20 to be executed by the computer of the mobile terminal 20, and in this case, the print data PD generated by the computer is transmitted to the printer 40.

The aforementioned embodiment can be changed into the following embodiment.

Figure 16:
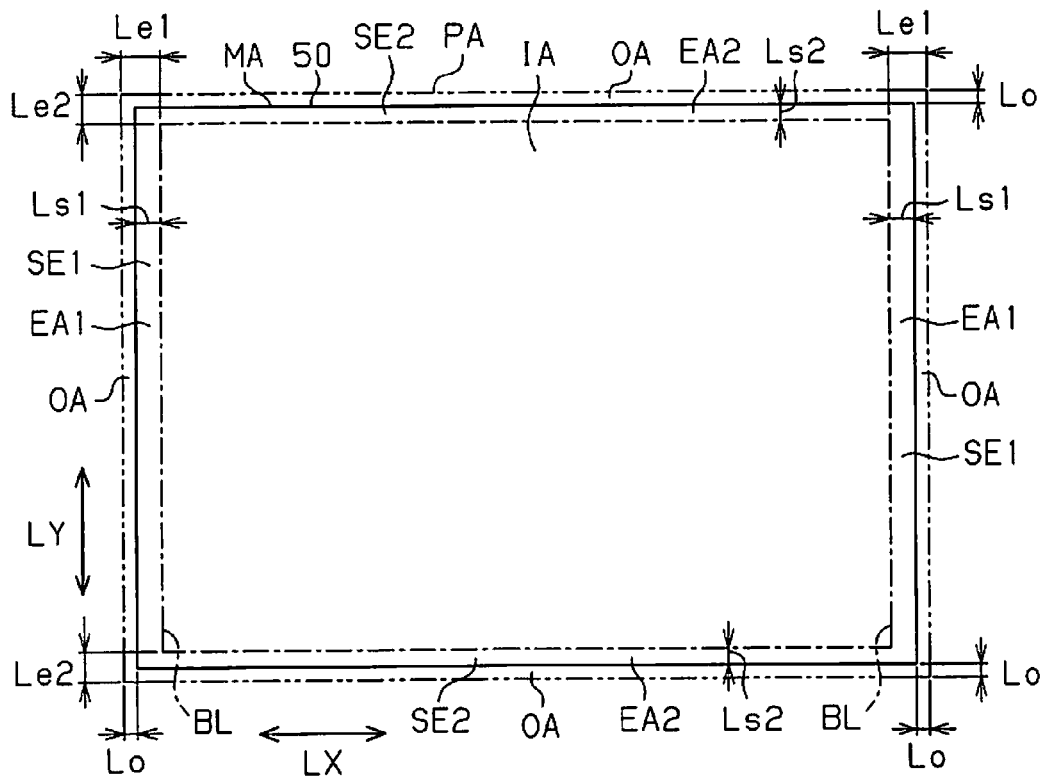
FIG. 16 is a plan view showing each area set on a lens sheet in a modified example.

As shown in FIG. 16, the end section area EA drawn only with large dots can be set to the end sections of both sides in the lens longitudinal direction LY (linear image longitudinal direction). In this case, as shown in FIG. 16, it is preferable that the width Ls2 of the second end section area EA2 on both sides of the lens longitudinal direction LY (linear image longitudinal direction) is narrower than the width Ls1 of the first end section area EA1 on both sides of the lens orthogonal direction LX. That is, the end section area EA2 in the lens longitudinal direction LY which is the direction in which it is more noticeable that the resolution is reduced when observed via a lens 53 is made narrower than the end section area EA1 in the lens orthogonal direction LX which is the direction in which it is less noticeable that the resolution is lowered. Therefore, the reduction in resolution of the three-dimensional image can be made less noticeable while the amount of generated mists can be effectively reduced. Also, the width Ls1 of the first end section area EA1 and the width Ls2 of the second end section area EA2 can be the same (Ls1=Ls2) or it can be set to satisfy the condition of Ls1<Ls2.

Figure 17:
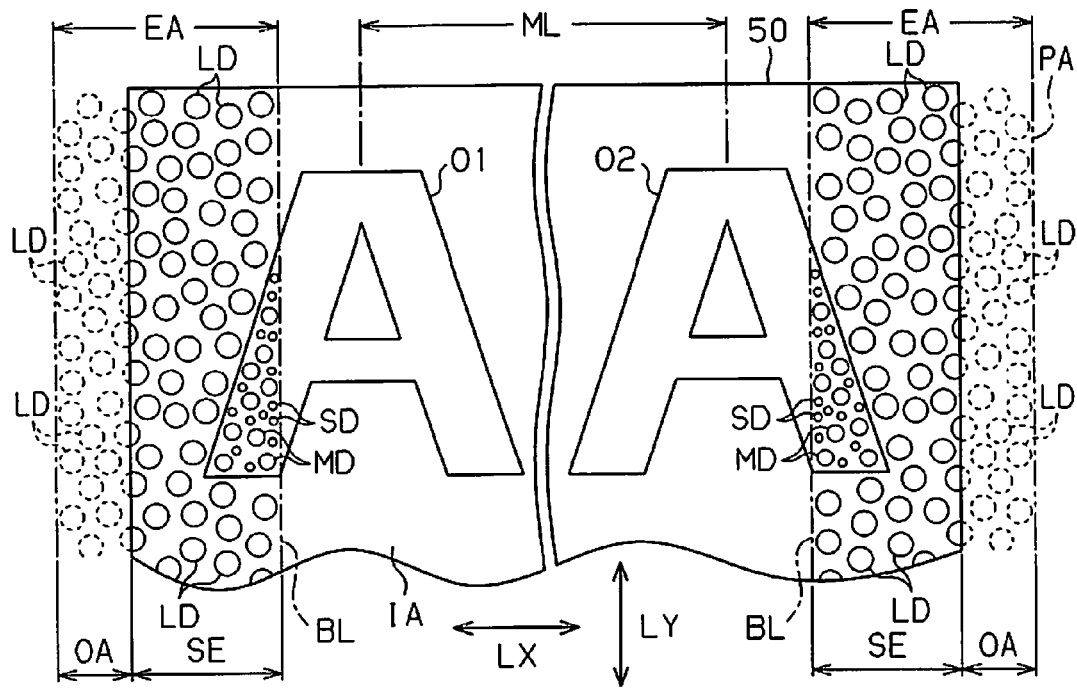
FIG. 17 is a schematic plan view of a sheet showing a condition of dots in the end section area according to a modified example.

As shown in FIG. 17, even in the end section area EA, for an object (partial image) in which the moving distance ML between a plurality of images constituting a three-dimensional image exceeds a predetermined threshold, printing can be performed under the same dot size condition as the inner section area IA without using large dots. Here, the definition of the moving distance ML differs depending on whether the three-dimensional image is a change image or a stereoscopic image. The moving distance ML in a change image is a value for determining the amount of the movement of a partial image at a predetermined position in the three-dimensional image when a three-dimensional image sheet 55 is held in a manner in which a line connecting both eyes of the user (observer) and the longitudinal direction of the lens 53 are orthogonal to each other, and the three-dimensional image sheet 55 is moved so as to be rotated around the predetermined axis of the lens 53 as the center under a certain observation condition such as an observation distance.

Also, the moving distance ML of the stereoscopic image is defined as the following. A three-dimensional image sheet is held, in which a three-dimensional image is arranged so as to face the lens layer so that the line connecting the eyes of the user and the longitudinal direction of the lens are orthogonal to each other. The moving distance ML is a value for determining the relative position of the observed partial image in the depth direction against the central position (moving distance ML=0) of the image in the depth direction when the three-dimensional image is observed in this state via the lens layer 52.

For example, for objects O1 and O2 in which the moving distance ML exceeds the threshold, printing is performed using small dots and medium dots. According to this structure, when the three-dimensional image is a stereoscopic image, the objects O1 and O2 on the front side or the back side exceeding the threshold in the depth direction of the object at the central position (moving distance ML=0) in the depth direction of the image can be observed comparatively clearly in a three-dimensional manner up to the section inside the end section area EA. For example, if this type of an object having a long moving distance ML is drawn with large dots LD, that section would be observed in a blurry manner when observed stereoscopically, but since the dot size condition for drawing the section in the end section area EA is the same as the inner section area IA, when the objects are observed via the lens 53, the objects O1 and O2 can be stereoscopically observed comparatively clearly to the section in the end section area EA.

Also, when the object is a change image, for an object (partial image) in which the moving distance ML exceeds the threshold, since the section in the end section area EA is also drawn with high resolution dots under the same dot size condition as the inner section area IA, the change image can be observed comparatively clearly. Also, it is preferable that the boundary BL of the inner section area IA and the end section area EA, that is, the boundary of areas having different resolution of dots is positioned, for example, inside the lens area LA, avoiding the boundary of the lens area LA. In this case, even if an image other than the observed image is observed because of the blotting of the ink of large dots, since the other image is an adjacent image in the change order, the distance between the object in the observed image and the corresponding object in the other image is comparatively short, so there is less incongruity in comparison to when the farthest object is observed.

It is not limited to that only large dots are formed in the end section area EA in the lens orthogonal direction LX (linear image array direction). Similar to the inner section area IA, an image is drawn in the end section area EA using plural types of dots having different sizes, and the end section area EA uses a mode (second halftone processing) in which the ejection ratio of the largest dots is increased in comparison to the inner section area IA. For example, a mode for increasing the formation ratio of large dots can be used, or a mode for increasing the formation ratio of dots larger than the small dots (e.g., medium dots) in comparison to small dots can be used. Especially when using two types of medium and small dots, a mode can be used in which small dots are reduced and medium dots are increased.

The program PR can be provided with a function to generate three-dimensional images based on a plurality of images that a user photographed with a camera. For example, if a plurality of images are selected to perform formation instruction operations for three-dimensional images, N pieces of images are compressed to 1/N in the lens orthogonal direction LX, and each compression is divided by the same number as the lens number to obtain linear images, and a three-dimensional image is formed by arranging each linear image in a predetermined order by N pieces per corresponding lens area. When generating print image data from the three-dimensional image, the ejection ratio of small dots is lowered in the end section area EA than the inner section area IA or the ejection ratio of large dots is increased. According this structure, by the ejection control by the computer 70 for executing the program PR, a three-dimensional image can be printed without losing much image quality when observed via a lens layer 52 and the mists generated at the time of printing can be reduced.

The lens intersection direction is not limited to the lens orthogonal direction, and for example, can be a direction at other angles to the lens longitudinal direction other than 90 degrees, such as 80, 60, or 110 degrees.

The lens sheet 50 can be carried to the lens orthogonal direction LX (linear image array direction) while printing an image with the print head 48. In this case, for the end section area EA of the lens sheet 50 in the linear image array direction LX, in the end section area EA positioned at both end sections of the conveyance direction Y of the lens sheet 50, the ejection ratio of small dots are reduced and the ejection ratio of large dots are increased.

The image to be printed on the lens sheet 50 is not limited to a three-dimensional image and it is enough that a three-dimensional image is included at least partially. For example, the image can include a three-dimensional image and a two-dimensional image.

It is not limited to a print mode in which the medium area MA is larger than the print area PA as in a frameless printing. For example, in the lens orthogonal direction LX, the medium area MA and the print area PA can be the same size. Also, in the lens orthogonal direction LX, the print area PA can be a little smaller than the medium area MA (for example, a value within the protruding width Lo in the linear image array direction LX). In such structures, even if the sheet 50 slightly dislocates in the linear image array direction LX with respect to the print area PA, the ejection ratio of the small dots ejected to the outside of the end section of the sheet 50 is reduced, thereby reducing the mists that drifts rather than landing on the sheet 50. Also, since the linear image array direction LX is a direction that matches the array direction of the lens 53 and is a direction in which the resolution decreases depending on the lens width when the three-dimensional image 56 is observed through the lens layer 52, even under the consideration that the rate of the formation of relatively large dots at the end section in the linear image array direction LX of a medium is increased, the decrease in resolution when the three-dimensional image 56 is observed through a lens layer 52 is not very noticeable.

The structure can be changed to a structure in which the printing is done on the lens sheet 50 in which the lens layer 52 having a lenticular lens and an ink absorbing layer 51 are joined, and an image including a three-dimensional image can be printed on a medium made of a film, a sheet, a foil, etc., and a lenticular lens layer can be pasted on the surface of the image side of the medium after printing. Also, the lenticular lens layer can be formed by spraying a transparent resin liquid from the nozzles of the liquid ejection head using an ink-jet record method using a liquid fuel ejection equipment on the surface of the image side of the medium. For the transparent resin liquid, the resin liquid having a lens shape formed on a medium can be hardened by radiating light (ultraviolet curable resin as an example) to form a lens layer using, e.g., a photocurable resin (ultraviolet radiation for example) for curing by light energy. In conclusion, a medium at the time of printing may or may not have a lens layer as long as a three-dimensional image sheet capable of three-dimensional visualization via a lens layer can be finally produced.

The printer can at least include a print function for printing on a medium and a communication function connectable to a device such as a mobile terminal in a communicable manner. For example, it is not limited to a printer and can be a multifunction machine. Also, the printer can be ink-jet type, dot impact type, or laser type. Furthermore, the printer can be a serial printer, a line printer or a page printer.

The printer may be a liquid ejection equipment for jetting and ejecting a liquid such as an ink. In addition, the state of the liquid ejected as a minute amount of liquid droplets from the liquid ejection equipment includes granular, tear-shaped, or one that leaves a tail in a string-shape. Also, such liquid can be made of a material that can be ejected from the liquid fuel ejection equipment. For example, a substance in a liquid phase is acceptable, and high or low viscosity liquid bodies, sol, gel water, and other liquid fluid bodies such as inorganic solvent, organic solvent, solution and liquid resin are also included. Also, not only liquid as a state of a substance is included, but particles made of pigments and solid bodies that are dissolved, dispersed or mixed in a solvent are also included. When the liquid is ink, the ink denotes a general aqueous ink, an oil based ink, or it contains various types of liquid compositions such as gel ink, hot melt ink, etc. The liquid ejection equipment can be, for example, a printing device or a microdispenser, etc.

According to the embodiment, in the printer, a program makes a computer execute a program for generating print data for a printer for printing an image including a three-dimensional image on a medium arranged so as to face a lens layer having a plurality of lenses. The program makes the computer execute steps including judging whether or not a target area in a print area of the image belongs to the end section area or the inner section area in the array direction of the plurality of linear images constituting the three-dimensional image performing a first halftone processing for generating dots under a high resolution dot size condition for the area of the image when the target area is the inner section area, and performing a second halftone processing for generating dots under a dot formation condition in which the formation ratio of dots is relatively smaller than the first halftone processing when the target area is the end section area.

According to this structure, by making the computer execute the program, print data for making the printer print can be provided. In addition, for example, the program can be executed by a computer of a host device which outputs print data to a printer, a computer in a printer, or a computer in a server which transmits print data to a printer.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A print data generation method for printing, by a printer, linear images constituting a three-dimensional image on a lens sheet having a plurality of lenticular lenses, the print data generation method comprising:
   obtaining image data including the three-dimensional image for printing the linear images on the lens sheet having the lenticular lenses each of which has edges defining a width of each of the lenticular lenses in an array direction of the linear images;
   setting, to the lens sheet, an end section area which is positioned at an end side of the lens sheet in the array direction relative to a boundary line that extends in a perpendicular direction perpendicular to the array direction and is offset in the array direction relative to all of the edges so that the boundary line does not overlap any of the edges when viewed along a normal direction to the lens sheet, and an inner section area positioned at an inner side of the lens sheet in the array direction relative to the boundary line;
   judging to which one of the end section area and the inner section area of the lens sheet a target area to be printed in a print area of the linear images belongs;
   performing a first halftone processing to generate, based on the image data, dot data for dots in the inner section area under a high resolution dot size condition in which a first ejection ratio of small dots and a first ejection ratio of large dots are set when the target area belongs to the inner section area, the performing of the first halftone processing including generating the dots data for the dots under the high resolution dot size condition, even in the end section area, for a range of an object in which a moving distance in the three-dimensional image exceeds a threshold; and
   performing a second halftone processing to generate, based on the image data, dot data for dots in the end section area other than the range under a dot formation condition in which a second ejection ratio of small dots, which is lower than the first ejection ratio of the small dots, and a second ejection ratio of large dots, which is higher than the first ejection ratio of the large dots, are set when the target area belongs to the end section area;
   outputting print data for printing the linear images, which includes the dot data generated by the first and second halftone processing, to the printer so as to cause the printer to print the linear images.

2. The print data generation method according to claim 1, wherein
   the print area is larger than the lens sheet at least in the array direction.

3. The print data generation method according to claim 2, wherein
   the performing of the second halftone processing includes generating the dot data for the dots including a largest dot size among an ejectable dot size.

4. The print data generation method according to claim 3, wherein
   the setting includes the setting the inner section area in an entire area in a longitudinal direction of the linear images of the print area.

5. The print data generation method according to claim 1, wherein
   the setting includes setting the inner section area that extends from a first end of the lens sheet to a second end of the lens sheet in the perpendicular direction.

6. The print data generation method according to claim 1, wherein
   the setting includes setting an additional end section area that is positioned at an end side in the perpendicular direction of the lens sheet, and setting a width in the perpendicular direction of the additional end section to be smaller than a width in the array direction of the end section area.

7. The print data generation method according to claim 5, wherein
   the perpendicular direction is equal to a conveyance direction in which the printer conveys the lens sheet using a conveyance mechanism of the printer.

8. The print data generation method according to claim 6, wherein the perpendicular direction is equal to a conveyance direction in which the printer conveys the lens sheet using a conveyance mechanism of the printer.

* * * * *